(12) United States Patent
Meyerzon et al.

(10) Patent No.: US 7,792,833 B2
(45) Date of Patent: Sep. 7, 2010

(54) RANKING SEARCH RESULTS USING LANGUAGE TYPES

(75) Inventors: Dmitriy Meyerzon, Bellevue, WA (US); Hugo Zaragoza, Barcelona (ES)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 11/412,723

(22) Filed: Apr. 26, 2006

(65) Prior Publication Data

US 2006/0294100 A1    Dec. 28, 2006

Related U.S. Application Data

(63) Continuation-in-part of application No. 11/073,381, filed on Mar. 3, 2005.

(51) Int. Cl.
    *G06F 17/30*    (2006.01)
(52) U.S. Cl. ............................................. 707/730
(58) Field of Classification Search ............... None
    See application file for complete search history.

(56) References Cited

U.S. PATENT DOCUMENTS

| | | | |
|---|---|---|---|
| 5,222,236 A | 6/1993 | Potash et al. | 707/102 |
| 5,257,577 A | 11/1993 | Clark | 100/99 |
| 5,594,660 A | 1/1997 | Sung et al. | 715/203 |
| 5,606,609 A | 2/1997 | Houser et al. | 713/179 |
| 5,848,404 A | 12/1998 | Hafner et al. | 707/3 |
| 5,893,092 A | 4/1999 | Driscoll | 707/5 |
| 5,920,859 A | 7/1999 | Li | 707/5 |
| 5,933,851 A | 8/1999 | Kojima et al. | 711/133 |
| 5,960,383 A | 9/1999 | Fleischer | 704/9 |
| 5,983,216 A | 11/1999 | Kirsch et al. | 707/9 |
| 5,987,457 A | 11/1999 | Ballard | 707/5 |
| 6,006,225 A | 12/1999 | Bowman et al. | 707/5 |
| 6,012,053 A | 1/2000 | Pant et al. | 707/3 |
| 6,032,196 A | 2/2000 | Monier | 709/245 |
| 6,041,323 A | 3/2000 | Kubota | 707/5 |
| 6,070,158 A | 5/2000 | Kirsch et al. | 707/3 |
| 6,070,191 A | 5/2000 | Narendran et al. | 709/226 |
| 6,098,064 A | 8/2000 | Pirolli et al. | 707/2 |

(Continued)

FOREIGN PATENT DOCUMENTS

DE    10029644 A1    1/2002

(Continued)

OTHER PUBLICATIONS

Lam Wai et al, "Automatic document classification based on probabilistic reasoning: model and performance analysis," Oct. 12-15, 1997, IEEE, Computational Cybernetics and Simulation vol. 3, pp. 2719-2723.*

(Continued)

*Primary Examiner*—Neveen Abel Jalil
*Assistant Examiner*—Farhan M Syed
(74) *Attorney, Agent, or Firm*—Merchant & Gould, P.C.

(57) ABSTRACT

Search results of a search query on a network are ranked according to an additional ranking function for the prior probability of relevance of a document based on document property. The ranking function can be adjusted based on a comparison of the language that a document is written in and the language that is associated with a search query. Both query-independent values and query-dependent values can be used to rank the document.

20 Claims, 4 Drawing Sheets

U.S. PATENT DOCUMENTS

| | | | | |
|---|---|---|---|---|
| 6,125,361 | A | 9/2000 | Chakrabarti et al. | 707/3 |
| 6,128,701 | A | 10/2000 | Malcolm et al. | 711/133 |
| 6,145,003 | A | 11/2000 | Sanu et al. | 709/225 |
| 6,151,624 | A | 11/2000 | Teare et al. | 709/217 |
| 6,167,369 | A * | 12/2000 | Schulze | 704/9 |
| 6,182,085 | B1 | 1/2001 | Eichstaedt et al. | 707/104.1 |
| 6,182,113 | B1 | 1/2001 | Narayanaswami | 709/203 |
| 6,185,558 | B1 | 2/2001 | Bowman et al. | 707/5 |
| 6,202,058 | B1 | 3/2001 | Rose et al. | 706/45 |
| 6,208,988 | B1 | 3/2001 | Schultz | 707/5 |
| 6,216,123 | B1 | 4/2001 | Robertson et al. | 707/3 |
| 6,222,559 | B1 | 4/2001 | Asano et al. | 345/440 |
| 6,240,407 | B1 | 5/2001 | Chang et al. | 707/2 |
| 6,240,408 | B1 | 5/2001 | Kaufman | 707/3 |
| 6,247,013 | B1 | 6/2001 | Morimoto | 707/10 |
| 6,263,364 | B1 | 7/2001 | Najork et al. | 709/217 |
| 6,285,367 | B1 | 9/2001 | Abrams et al. | 345/357 |
| 6,285,999 | B1 | 9/2001 | Page | 707/5 |
| 6,304,864 | B1 | 10/2001 | Liddy et al. | 706/15 |
| 6,317,741 | B1 | 11/2001 | Burrows | 707/5 |
| 6,327,590 | B1 | 12/2001 | Chidlovskii | 707/5 |
| 6,349,308 | B1 | 2/2002 | Whang et al. | 707/107 |
| 6,351,467 | B1 | 2/2002 | Dillon | 370/432 |
| 6,351,755 | B1 | 2/2002 | Najork et al. | 715/206 |
| 6,360,215 | B1 | 3/2002 | Judd et al. | 707/3 |
| 6,385,602 | B1 | 5/2002 | Tso et al. | 707/3 |
| 6,389,436 | B1 | 5/2002 | Chakrabarti et al. | 715/229 |
| 6,418,433 | B1 | 7/2002 | Chakrabarti et al. | 707/3 |
| 6,418,452 | B1 | 7/2002 | Kraft et al. | 707/200 |
| 6,418,453 | B1 | 7/2002 | Kraft et al. | 707/200 |
| 6,442,606 | B1 | 8/2002 | Subbaroyan et al. | 709/224 |
| 6,473,752 | B1 | 10/2002 | Fleming | 707/4 |
| 6,484,204 | B1 | 11/2002 | Rabinovich | 709/226 |
| 6,516,312 | B1 | 2/2003 | Kraft et al. | 707/3 |
| 6,539,376 | B1 | 3/2003 | Sundaresan et al. | 707/5 |
| 6,546,388 | B1 * | 4/2003 | Edlund et al. | 707/5 |
| 6,547,829 | B1 | 4/2003 | Meyerzon et al. | 715/234 |
| 6,549,896 | B1 | 4/2003 | Candan et al. | 707/2 |
| 6,549,897 | B1 | 4/2003 | Katariya et al. | 707/5 |
| 6,594,682 | B2 | 7/2003 | Peterson et al. | 718/102 |
| 6,598,047 | B1 | 7/2003 | Russell et al. | 707/5 |
| 6,598,051 | B1 | 7/2003 | Wiener et al. | 707/100 |
| 6,601,075 | B1 | 7/2003 | Huang et al. | 707/104.1 |
| 6,622,140 | B1 | 9/2003 | Kantrowitz | 707/5 |
| 6,628,304 | B2 | 9/2003 | Mitchell et al. | 345/734 |
| 6,633,867 | B1 | 10/2003 | Kraft et al. | 707/3 |
| 6,633,868 | B1 | 10/2003 | Min | 707/3 |
| 6,636,853 | B1 | 10/2003 | Stephens | 707/10 |
| 6,638,314 | B1 | 10/2003 | Meyerzon et al. | 715/234 |
| 6,671,683 | B2 | 12/2003 | Kanno | 707/5 |
| 6,701,318 | B2 | 3/2004 | Fox et al. | 707/10 |
| 6,718,324 | B2 | 4/2004 | Edlund et al. | 707/5 |
| 6,718,365 | B1 | 4/2004 | Dutta | 709/203 |
| 6,738,764 | B2 | 5/2004 | Mao et al. | 707/5 |
| 6,763,362 | B2 | 7/2004 | McKeeth | 707/104.1 |
| 6,766,316 | B2 | 7/2004 | Caudill et al. | 707/3 |
| 6,766,422 | B2 | 7/2004 | Beyda | 711/137 |
| 6,775,659 | B2 | 8/2004 | Clifton-Bligh | 707/1 |
| 6,775,664 | B2 | 8/2004 | Lang et al. | 707/3 |
| 6,778,997 | B2 | 8/2004 | Sundaresan et al. | 707/104.1 |
| 6,829,606 | B2 | 12/2004 | Ripley | 707/5 |
| 6,859,800 | B1 | 2/2005 | Roche et al. | 707/3 |
| 6,862,710 | B1 | 3/2005 | Marchisio | 715/501.1 |
| 6,871,202 | B2 | 3/2005 | Broder | 707/7 |
| 6,883,135 | B1 | 4/2005 | Obata et al. | 715/202 |
| 6,886,010 | B2 | 4/2005 | Kostoff | 707/3 |
| 6,886,129 | B1 | 4/2005 | Raghavan et al. | 715/501.1 |
| 6,910,029 | B1 | 6/2005 | Sundaresan | 707/2 |
| 6,931,397 | B1 | 8/2005 | Sundaresan | 707/5 |
| 6,934,714 | B2 | 8/2005 | Meinig | 707/102 |
| 6,944,609 | B2 | 9/2005 | Witbrock | 707/3 |
| 6,947,930 | B2 | 9/2005 | Anick et al. | 707/5 |
| 6,959,326 | B1 | 10/2005 | Day et al. | 709/217 |
| 6,973,490 | B1 | 12/2005 | Robertson et al. | 709/224 |
| 6,990,628 | B1 | 1/2006 | Palmer et al. | 707/501 |
| 7,016,540 | B1 | 3/2006 | Gong et al. | 382/225 |
| 7,028,029 | B2 | 4/2006 | Kamvar et al. | 707/5 |
| 7,039,234 | B2 | 5/2006 | Geidl et al. | 382/187 |
| 7,051,023 | B2 | 5/2006 | Kapur et al. | 707/5 |
| 7,072,888 | B1 | 7/2006 | Perkins | 707/10 |
| 7,076,483 | B2 | 7/2006 | Preda et al. | 707/5 |
| 7,080,073 | B1 | 7/2006 | Jiang et al. | 707/7 |
| 7,107,218 | B1 * | 9/2006 | Preston | 704/270 |
| 7,152,059 | B2 | 12/2006 | Monteverde | 707/3 |
| 7,181,438 | B1 | 2/2007 | Szabo | 707/2 |
| 7,197,497 | B2 | 3/2007 | Cossock | 707/7 |
| 7,231,399 | B1 | 6/2007 | Bem et al. | 707/102 |
| 7,243,102 | B1 | 7/2007 | Naam et al. | 707/7 |
| 7,246,128 | B2 | 7/2007 | Jordahl | 707/100 |
| 7,257,574 | B2 | 8/2007 | Parikh | 707/3 |
| 7,257,577 | B2 | 8/2007 | Fagin et al. | 707/7 |
| 7,260,573 | B1 | 8/2007 | Jeh et al. | 707/7 |
| 7,281,002 | B2 | 10/2007 | Farrell | 707/3 |
| 7,308,643 | B1 | 12/2007 | Zhu et al. | 715/206 |
| 7,328,401 | B2 | 2/2008 | Obata et al. | 715/205 |
| 7,346,604 | B1 | 3/2008 | Bharat et al. | 707/3 |
| 7,356,530 | B2 | 4/2008 | Kim et al. | 707/7 |
| 7,386,527 | B2 | 6/2008 | Harris et al. | 706/59 |
| 7,428,530 | B2 | 9/2008 | Ramarathnam et al. | 707/3 |
| 7,519,529 | B1 | 4/2009 | Horvitz | 704/7 |
| 2001/0042076 | A1 | 11/2001 | Fukuda | 707/500 |
| 2002/0055940 | A1 | 5/2002 | Elkan | 707/104.1 |
| 2002/0062323 | A1 | 5/2002 | Takatori et al. | 715/206 |
| 2002/0078045 | A1 | 6/2002 | Dutta | 707/7 |
| 2002/0099694 | A1 | 7/2002 | Diamond et al. | 707/3 |
| 2002/0103798 | A1 | 8/2002 | Abrol et al. | 707/5 |
| 2002/0107861 | A1 | 8/2002 | Clendinning et al. | 77/101 |
| 2002/0107886 | A1 | 8/2002 | Gentner et al. | 715/255 |
| 2002/0129014 | A1 | 9/2002 | Kim et al. | 707/7 |
| 2002/0169595 | A1 | 11/2002 | Agichtein et al. | 704/9 |
| 2002/0169770 | A1 | 11/2002 | Kim et al. | 707/5 |
| 2003/0037074 | A1 | 2/2003 | Dwork et al. | 715/229 |
| 2003/0053084 | A1 | 3/2003 | Geidl et al. | 358/1.5 |
| 2003/0055810 | A1 | 3/2003 | Cragun et al. | 707/1 |
| 2003/0061201 | A1 | 3/2003 | Grefenstette et al. | 707/3 |
| 2003/0065706 | A1 * | 4/2003 | Smyth et al. | 709/200 |
| 2003/0074368 | A1 | 4/2003 | Schuetze et al. | 707/103 R |
| 2003/0208482 | A1 | 11/2003 | Kim et al. | 707/3 |
| 2003/0217007 | A1 | 11/2003 | Fukushima et al. | 705/51 |
| 2003/0217047 | A1 | 11/2003 | Marchisio | 707/3 |
| 2003/0217052 | A1 | 11/2003 | Rubenczyk et al. | 707/3 |
| 2004/0003028 | A1 | 1/2004 | Emmett et al. | 709/203 |
| 2004/0006559 | A1 | 1/2004 | Gange et al. | 707/3 |
| 2004/0049766 | A1 | 3/2004 | Bloch et al. | 717/121 |
| 2004/0093328 | A1 | 5/2004 | Damle | 707/3 |
| 2004/0111408 | A1 | 6/2004 | Caudill et al. | 707/3 |
| 2004/0117351 | A1 | 6/2004 | Challapalli et al. | 707/2 |
| 2004/0148278 | A1 | 7/2004 | Milo et al. | 707/3 |
| 2004/0181515 | A1 | 9/2004 | Ullmann et al. | 707/3 |
| 2004/0186827 | A1 | 9/2004 | Anick et al. | 707/3 |
| 2004/0194099 | A1 * | 9/2004 | Lamping et al. | 718/100 |
| 2004/0199497 | A1 | 10/2004 | Timmons | 707/3 |
| 2004/0205497 | A1 | 10/2004 | Alexander et al. | 715/501.1 |
| 2004/0215606 | A1 * | 10/2004 | Cossock | 707/3 |
| 2004/0215664 | A1 | 10/2004 | Hennings et al. | 707/104.1 |
| 2004/0254932 | A1 | 12/2004 | Gupta et al. | 707/7 |
| 2005/0033742 | A1 | 2/2005 | Kamvar et al. | 707/7 |
| 2005/0044071 | A1 | 2/2005 | Cho et al. | 707/3 |
| 2005/0055340 | A1 | 3/2005 | Dresden | 707/3 |
| 2005/0055347 | A9 | 3/2005 | Cho et al. | 707/5 |
| 2005/0060186 | A1 | 3/2005 | Blowers et al. | 705/2 |
| 2005/0060304 | A1 | 3/2005 | Parikh | 707/3 |
| 2005/0060311 | A1 | 3/2005 | Tong et al. | 707/1 |
| 2005/0071328 | A1 | 3/2005 | Lawrence | 707/3 |

| | | | |
|---|---|---|---|
| 2005/0071741 A1 | 3/2005 | Acharya et al. ............. 715/208 |
| 2005/0086192 A1 | 4/2005 | Kodama ......................... 707/1 |
| 2005/0086206 A1 | 4/2005 | Balasubramanian et al. ... 707/3 |
| 2005/0086583 A1 | 4/2005 | Obata et al. .................. 715/229 |
| 2005/0144162 A1 | 6/2005 | Liang ............................. 707/3 |
| 2005/0154746 A1 | 7/2005 | Liu et al. ..................... 707/101 |
| 2005/0165781 A1 | 7/2005 | Kraft et al. ..................... 707/7 |
| 2005/0187965 A1 | 8/2005 | Abajian ....................... 707/102 |
| 2005/0192936 A1 | 9/2005 | Meek et al. ..................... 707/3 |
| 2005/0192955 A1 | 9/2005 | Farrell ............................ 707/5 |
| 2005/0210006 A1 | 9/2005 | Robertson ....................... 707/3 |
| 2005/0216533 A1 | 9/2005 | Berkhin ...................... 707/204 |
| 2005/0240580 A1 | 10/2005 | Zamir et al. .................... 707/4 |
| 2005/0251499 A1 | 11/2005 | Huang ............................ 707/1 |
| 2005/0262050 A1 | 11/2005 | Fagin et al. .................... 707/3 |
| 2005/0283473 A1 | 12/2005 | Rousso et al. .................. 707/5 |
| 2006/0036598 A1 | 2/2006 | Wu ................................ 707/5 |
| 2006/0047649 A1 | 3/2006 | Liang ............................. 707/4 |
| 2006/0161534 A1 | 7/2006 | Carson et al. .................. 707/3 |
| 2006/0173560 A1 | 8/2006 | Widrow ........................ 700/48 |
| 2006/0195440 A1 | 8/2006 | Burges et al. .................. 707/5 |
| 2006/0206460 A1 | 9/2006 | Gadkari et al. ................. 707/3 |
| 2006/0206476 A1 | 9/2006 | Kapur et al. .................... 707/5 |
| 2006/0282455 A1 | 12/2006 | Lee et al. ..................... 707/102 |
| 2006/0287993 A1 | 12/2006 | Yao et al. ........................ 707/4 |
| 2007/0038616 A1 | 2/2007 | Guha ............................. 707/4 |
| 2007/0038622 A1 | 2/2007 | Meyerzon et al. .............. 705/5 |
| 2007/0073748 A1 | 3/2007 | Barney ....................... 707/101 |
| 2007/0106659 A1 | 5/2007 | Lu et al. ......................... 707/7 |
| 2007/0150473 A1 | 6/2007 | Li et al. .......................... 707/7 |
| 2007/0198459 A1 | 8/2007 | Boone et al. .................... 707/1 |
| 2007/0276829 A1 | 11/2007 | Wang et al. ..................... 707/7 |
| 2009/0106221 A1 | 4/2009 | Meyerzon et al. .............. 707/5 |
| 2009/0106223 A1 | 4/2009 | Meyerzon et al. .............. 707/5 |
| 2009/0106235 A1 | 4/2009 | Tankovich et al. ............. 707/5 |

FOREIGN PATENT DOCUMENTS

| | | |
|---|---|---|
| EP | 0950961 | 10/1999 |
| EP | 1050830 | 11/2000 |
| EP | 1120717 | 8/2001 |
| EP | 1282060 | 2/2002 |
| EP | 1557770 | 7/2005 |
| JP | 10091638 | 4/1998 |
| JP | 11328191 | 11/1999 |
| JP | 2002-091843 | 3/2002 |
| JP | 2003-248696 | 9/2003 |
| KR | 10-2002-0015838 A | 3/2002 |
| KR | 10-2003-0082109 A | 10/2003 |
| KR | 10-2006-0116042 A | 11/2006 |

OTHER PUBLICATIONS

Brin, S. et al., "The Anatomy of a Large-Scale Hypertextual Web Search Engine", Proceedings of the Seventh International World-Wide Web Conference, 'Online! Apr. 14, 1998, pp. 1-26.
Carmel, D. et al., "Searching XML Documents Via XML Fragments", SIGIR Toronto, Canada, Jul.-Aug. 2003, pp. 151-158.
Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.
Fagin, R. et al., "Searching the Workplace Web", IBM Almaden Research Center, In Proceedings of the Twelfth International World Wide Web Conference, Budapest, 2003, 21 pgs.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.
Jones, K. et al., "A probabilistic model of information retrieval: development and status", Department of Information Science, City University, London, Aug. 1998, 74 pgs.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Losee, R. et al., "Research in Information Organization", Literature Review, School of Information and Library Science, Section 4, pp. 53-96, Jan. 2001.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Nelson, Chris, "Use of Metadata Registries for Searching for Statistical Data", IEEE 2002, Dimension EDI Ltd., pp. 232-235, 2002.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.
Singhal, A. et al., "AT&T at TREC-9", Proceedings of the Ninth Text Retrieval Conference, NIST Special Publication 500-249, 'Online! 2001, pp. 103-105.
Sturdy, Derek, "Squirrels and nuts: metadata and knowledge management", Business Information Review, 18(4), pp. 34-42, Dec. 2001.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.

Zamir, O. et al., "Grouper: A Dynamic Clustering Interface to Web Search Results", Computer Networks (Amsterdam, Netherlands: 1999), 31(11-16): 1361-1374, 1999.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.

"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

U.S. Appl. No. 11/019,091, filed Dec. 21, 2004 entitled "Ranking Search Results Using Feature Extraction".

U.S. Appl. No. 10/804,326, filed Mar. 18, 2004 entitled "Field Weighting in Text Document Searching".

U.S. Appl. No. 10/609,315, filed Jun. 27, 2003, entitled "Normalizing Document Metadata Using Directory Services".

U.S. Appl. No. 11/238,906, filed Sep. 29, 2005 entitled "Click Distance Determination".

U.S. Appl. No. 10/955,462, filed Sep. 30, 2004 entitled "System and Method for Incorporating Anchor Text Into Ranking Search Results".

U.S. Appl. No. 10/955,983, filed Sep. 30, 2004 entitled "System and Method for Ranking Search Results Using Click Distance".

Official Action in U.S. Appl. No. 10/609,315 mailed Dec. 15, 2005.

Official Action in U.S. 10/09,315 mailed Jun. 1, 2006.

EP Exam Report in EP 05105048.2-2201 mailed Apr. 23, 2007.

Agichten et al., "Improving Web Search Ranking by Incorporating User Behavior Information"—http://www.mathcs.emory.edu/~eugene/papers/sigir2006ranking.pdf, 8 pp.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&d1=GUIDE&CFID=22810237&CFTOKEN=34449120, pp. 585-593.

Burges, Christopher J.C. et al. "Learning to Rank with Nonsmooth Cost Functions"—http://books.nips.cc/papers/txt/nips19/NIPS2006_0574.txt, 2 pp.

Filip Radlinski, et al.,, "Query Chains: Learning to Rank from Implicit Feedback, "http://delivery.acm.org/10.1145/1090000/1081899/p239-radlinski.pdf?key1=1081899&key2=3628533811&coll=GUIDE& CFID=27212902&CFTOKEN=53118399, *KDD*'05, Chicago, IL, Aug. 21-24, 2005,10 pages.

Irina Matveeva, et al., "High Accuracy Retrieval with Multiple Nested Ranker," http://people.cs.uchicago.edu/~matveeva/RankerSIGIR06.pdf, *SIGIR*'06, Seattle, WA Aug. 6-11, 2006, 8 pages.

Gui-Rong Xue, et al., "Optimizing Web Search Using Web Click-Through Data," http://people.cs.vt.edu/~xwensi/Publication/p118-xue.pdf, *CIKM*'04, Nov. 8-13, 2004, 9 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

MSDN, "Understanding Ranking," http://msdn.microsoft.com/en-us/library/ms142524.aspx, Sep. 2007, 4 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

U.S. Official Action in U.S. Appl. No. 11/073,381 mailed Sep. 18, 2007.

PCT Search Report in PCT/US2006/031965 mailed Jan. 11, 2007.

EP Exam Report in EP 00309121.2-1527 mailed Feb. 8, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Najork, Marc et al., "Breadth-First Crawling Yields High-Quality Pages", ACM, Compaq Systems Research Center, Hong Kong, 2001, pp. 114-118.

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the Worl-Wide Web", IEEE, 1997, pp. 189-199.

Huang et al., "Design and Implementation of a Chinese Full-Text Retrieval System Based on Probabilistic Model", IEEE, 1993, pp. 1090-1093.

Yuwono, Budi and Lee, Dik L., "Search and Ranking Algorithms for Locating Resources on the World Wide Web", IEEE, 1996, pp. 164-170.

Smyth, Barry, "Relevance at a Distance—An Investigation of Distance-Biased Personalization on the Mobile Internet", no date, pp. 1-6.

Senecal, Sylvain, "Consumers' Decision-Making Process and Their Online Shopping Behavior: A Clickstream Analysis", Jun. 1, 2004, pp. 1600-1607.

Fagin, Ronald, "Searching the Workplace Web", Mar. 3, 2005, pp. 1-10.

Wen, J1-Rong, "Query Clustering Using User Logs", Jan. 2002, pp. 59-81.

U.S. Official Action in U.S. Appl. No. 10/981,962 mailed Apr. 5, 2006.

U.S. Official Action in U.S. Appl. No. 10/981,962 mailed Sep. 21, 2006.

U.S. Official Action in U.S. Appl. No. 10/804,326 mailed Oct. 16, 2006.

U.S. Official Action in U.S. Appl. No. 10/955,462 mailed Nov. 3, 2006.

U.S. Official Action in U.S. Appl. No. 10/955,983 mailed Mar. 22, 2007.

U.S. Official Action in U.S. Appl. No. 10/981,962 mailed Apr. 30, 2007.

U.S. Official Action in U.S. Appl. No. 10/955,462 mailed May 11, 2007.

U.S. Official Action in U.S. Appl. No. 11/019,091 mailed Jun. 20, 2007.

U.S. Official Action in U.S. Appl. No. 10/955,462 mailed Sep. 10, 2007.

U.S. Official Action in U.S. Appl. No. 10/955,983 mailed Nov. 13, 2007.

U.S. Official Action in U.S. Appl. No. 10/804,326 mailed Dec. 11, 2007.
U.S. Official Action in U.S. Appl. No. 11/238,906 mailed Jan. 8, 2008.
U.S. Official Action in U.S. Appl. No. 10/981,962 mailed Mar. 17, 2008.
U.S. Official Action in U.S. Appl. No. 11/019,091 mailed Apr. 3, 2008.
U.S. Official Action in U.S. Appl. No. 11/073,381 mailed Jul. 10, 2008.
U.S. Official Action in U.S. Appl. No. 11/206,286 mailed Jul. 14, 2008.
U.S. Official Action in U.S. Appl. No. 11/238,906 mailed Sep. 16, 2008.
EP Search Report in EP 00309121 mailed Jul. 18, 2002.
EP Exam Report in EP 00309121.2-1522 mailed Jul. 4, 2003.
EP Exam Report in EP 00309121.2-1527 mailed Jun. 16, 2004.
EP Search Report in EP 05105048 mailed Jan. 17, 2006.
EP Search Report in EP 05105110 dated Aug. 11, 2006.
PCT Search Report in PCT/US2006/031965 mailed Jan. 11, 2007.
U.S. Official Action in U.S. Appl. No. 11/874,844 mailed Nov. 13, 2009.
U.S. Official Action in U.S. Appl. No. 11/238,906 mailed Dec. 18, 2009.
U.S. Official Action in U.S. Appl. No. 11/019,091 mailed Sep. 1, 2009.
U.S. Official Action in U.S. Appl. No. 11/073,381 mailed Sep. 29, 2009.
Chinese First Official Action in 200680029645.1 mailed Jun. 19, 2009.
Chinese First Official Action in 200680035828.4 mailed Jun. 19, 2009.
Chinese Third Official Action in 200510088213.5 mailed Sep. 4, 2009.
Japanese Notice of Rejection in 2008-527094 mailed Sep. 11, 2009.
U.S. Official Action in U.S. Appl. No. 11/073,381 mailed Apr. 12, 2010.
Japanese Final Rejection in 2008-527094 mailed Jan. 22, 2010.
Egyptian Official Action in PCT 269/2008 mailed Feb. 1, 2010.
Chinese Second Office Action in 200680029645.1 mailed Apr. 6, 2010.
Chen, Hsinchun et al., "A Smart Itsy Bitsy Spider for the Web", Journal of the American Society for Information Science, 49(7), 1998, pp. 604-618.
Chen, Michael et al., Cha Cha, "A System for Organizing Intranet Search Results", Computer Science Department, University of California, Berkeley, 1999, pp. 1-12.
Kleinberg, Jon M., "Authoritative Sources in a Hyperlinked Environment", Proceedings of the aCM-SIAM symposium on Discrete Algorithms, 1998, 34 pp.
U.S. Appl. No. 09/493,748, filed Jan. 28, 2000 entitled "Adaptive Web Crawling Using a Statistical Model".
U.S. Appl. No. 11/874,844, filed Oct. 18, 2007 entitled "Enterprise Relevancy Ranking Using a Neural Network".
U.S. Appl. No. 11/874,579, filed Oct. 18, 2007 entitled "Ranking and Providing Search Results Based in Part on a Number of Click-Through Features".
U.S. Appl. No. 12/207,910, filed Sep. 10, 2008 entitled "Document Length as a Static Relevance Feature for Ranking Search Results".
U.S. Official Action in U.S. Appl. No. 10/804,326 mailed Jun. 7, 2007.
U.S. Official Action in U.S. Appl. No. 10/955,983 mailed Jul. 21, 2008.
U.S. Official Action in U.S. Appl. No. 10/804,326 mailed Dec. 10, 2008.
U.S. Official Action in U.S. Appl. No. 11/019,091 mailed Dec. 11, 2008.
U.S. Official Action in U.S. Appl. No. 10/955,983 mailed Dec. 18, 2008.
U.S. Official Action in U.S. Appl. No. 11/206,286 mailed Dec. 24, 2008.
U.S. Official Action in U.S. Appl. No. 11/073,381 mailed Apr. 15, 2009.
U.S. Official Action in U.S. Appl. No. 11/238,906 mailed May 19, 2009.
U.S. Official Action in U.S. Appl. No. 10/955,983 mailed Jun. 10, 2009.
Chinese Second Official Action in 200510088527.5 mailed Dec. 26, 2008.
PCT Search Report in PCT/US2008/011894 mailed Feb. 27, 2009.
Chinese Final Rejection in 200510088213.5 mailed Mar. 6, 2009.

* cited by examiner

RANKING SEARCH RESULTS USING LANGUAGE TYPES

CROSS-REFERENCE TO RELATED APPLICATIONS

The present disclosure is a continuation-in-part of and claims the benefit under 15 USC §120 of the filing of patent application having Ser. No. 11/073,381, entitled, "System and Method for Ranking Search Results Using File Types," filed Mar. 3, 2005. The present disclosure is related to patent applications having Ser. No. 10/955,462, entitled, "System and Method for Incorporating Anchor Text into Ranking Search Results", filed Sep. 30, 2004; Ser. No. 10/955,983, entitled, "System and Method for Ranking Search Results Using Click Distance", filed Sep. 30, 2004; Ser. No. 10/804,326, entitled "Field Weighting in Text Document Searching", filed on Mar. 18, 2004. The related applications are assigned to the assignee of the present patent application and are hereby incorporated by reference.

BACKGROUND OF THE INVENTION

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Another evaluation that certain search engines may employ to improve the quality of the results is to modify the rank of the results by a selected ranking function. One exemplary prior art ranking function determines that when one page links to another page, it is effectively casting a vote for the other page. The more votes that are cast for a page, the more important the page. The ranking function can also take into account who cast the vote. The more important the page, the more important their vote. These votes are accumulated and used as a component of the ratings of the pages on the network.

A ranking function is used to improve the quality of the ranking. Ranking functions can rely on combination of content in the document (such as terms contained in the body or metadata of the document), or data contained in other documents about this document (such as anchor text), measures of importance obtained by analyzing the URL graph and other query independent measures of relevance.

Typically, when evaluating the performance of a ranking function a set of users are asked to make relevance judgments on the top N (e.g., 10) documents returned by the search engine with a given ranking function for a given set of evaluation queries. The document corpus and the set of queries are kept fixed, so that performance of different ranking functions may be compared side-by-side eliminating all other variables from the equation. This is typically done in a prototyping (research) environment. A set of relevance judgments may also be obtained from a live system by asking users to volunteer relevance judgments for the search results on an arbitrary set of queries. Relying on relevance judgments to measure the performance allows a ranking function to be optimized by iteratively varying ranking parameters and measuring performance.

SUMMARY OF THE INVENTION

Embodiments of the present invention are related to a system and method for ranking search results according to language. The ranking function comprises a feature to penalize documents that do not match the language of the query, independently of other ranking features.

The language of the document is identified by performing statistical analysis of the character distribution and comparing it to trained language character distribution. The language of the document is detected (instead of relying on the metadata of the document such as language tags in html) because language detection is a relatively straightforward procedure with high precision, and the metadata is often ambiguous or wrong, or missing. Language detection is typically performed during the indexing process.

At query time the language of the query is obtained, for example, from the browser request headers or a client application. The query language is compared with the candidate document language. The language is considered matching if the document and query language match at least by primary language (for example, a German-Swiss query will typically be considered to match a German-German document), or if the document's primary language is English. Thus, documents written in a language that the user can't read are penalized, with the exception of English documents because of the assumption that most people that use the Internet can read English or understand different flavors of English.

The ranking function is modified with a language type feature that is used to adjust the ranking of documents based on the language types of files and the query language, thus improving the overall precision of the search engine. The weight of relevancy associated with each language type comparison is derived from the set of relevance judgments obtained from previous queries and feedback. In addition, by optimizing the weight, the weight may be treated as a ranking function parameter, and the behavior of the performance measure on different values of the weight may be observed.

Once the language type comparison is performed for a page, the file type is incorporated into the score for the page. The page's score incorporating the language type comparison determines the page's rank among the other pages within the search results.

Additionally, other document properties may affect the relevance of a document independent of the query. These document properties include the file type and the size of the file. Values may be associated with these document properties and incorporated into a scoring function to affect the rank of a document.

In one aspect, the network is first "crawled" to generate a table of properties associated with the links and pages of the network. "Crawling" refers to automatically collecting several documents (or any analogous discrete unit of information) into a database referred to as an index. Crawling traverses multiple documents on the network by following document reference links within certain documents, and then processing each document as found. The documents are processed by identifying key words or general text in the documents to create an index.

DETAILED DESCRIPTION

The present disclosure comprises embodiments that are described more fully hereinafter with reference to the accompanying drawings, which form a part hereof, and which show, by way of illustration, specific exemplary embodiments. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The following detailed description is, therefore, not to be taken in a limiting sense.

Illustrative Operating Environment

Figure 1:
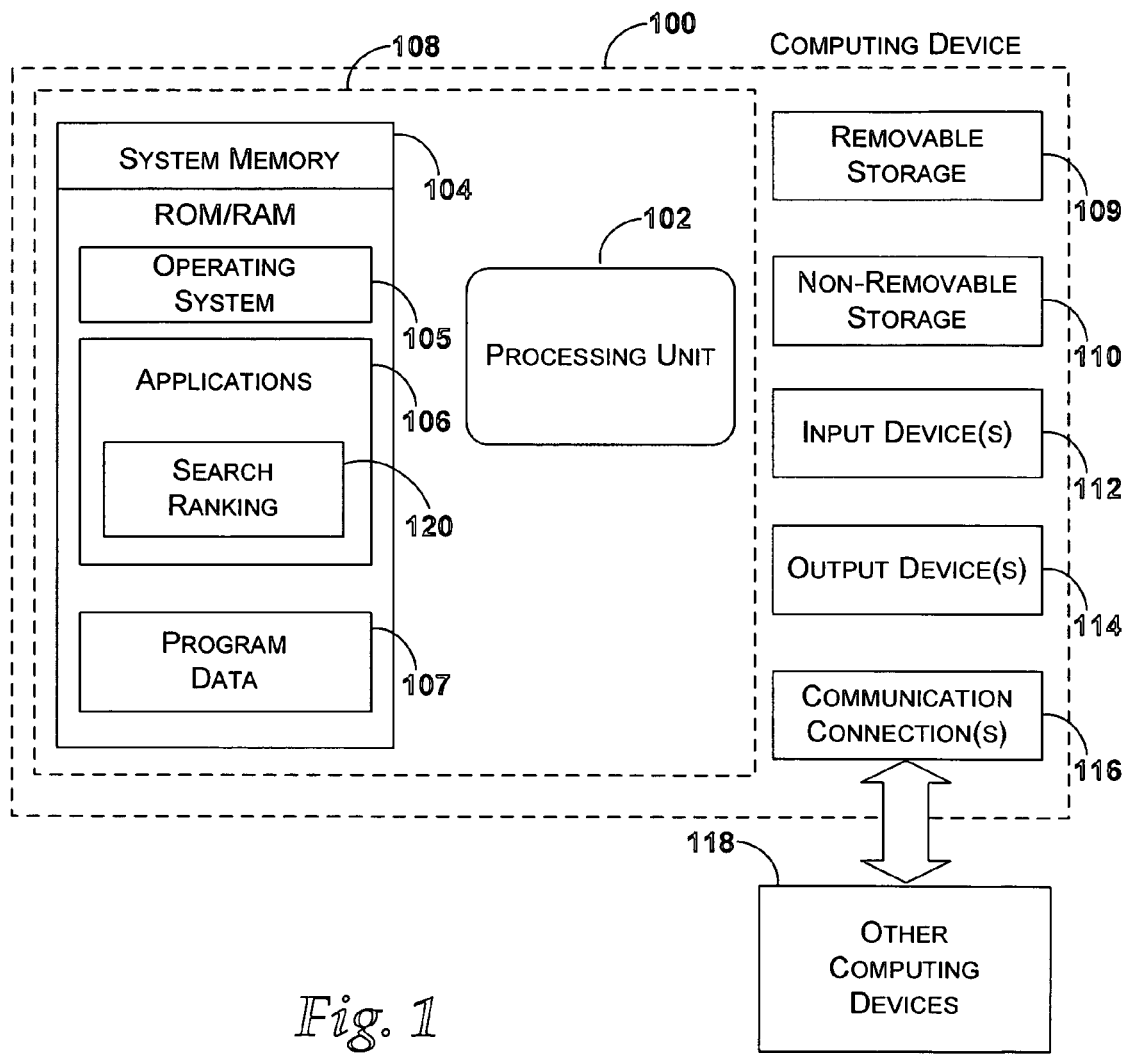
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search ranking application. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Ranking Using Language Type Comparisons

Embodiments are related to a ranking function for a search engine. The quality of a search engine is typically determined by the relevance of the documents according to the ranks assigned by the ranking function. The ranking function may be based on multiple features. Some of these features may depend on the query, while others are considered query-independent. Language type comparisons are a query-dependent measure of relevance referred to as language comparison type prior. The language type of the file and the query language are compared to generate a language-based prior to rank the search results. A language prior refers to a prior probability of belief that a document should be relevant given its language One method for establishing type-base priors is through the use of relevance judgments to weigh the language types according to their relevance.

Figure 2:
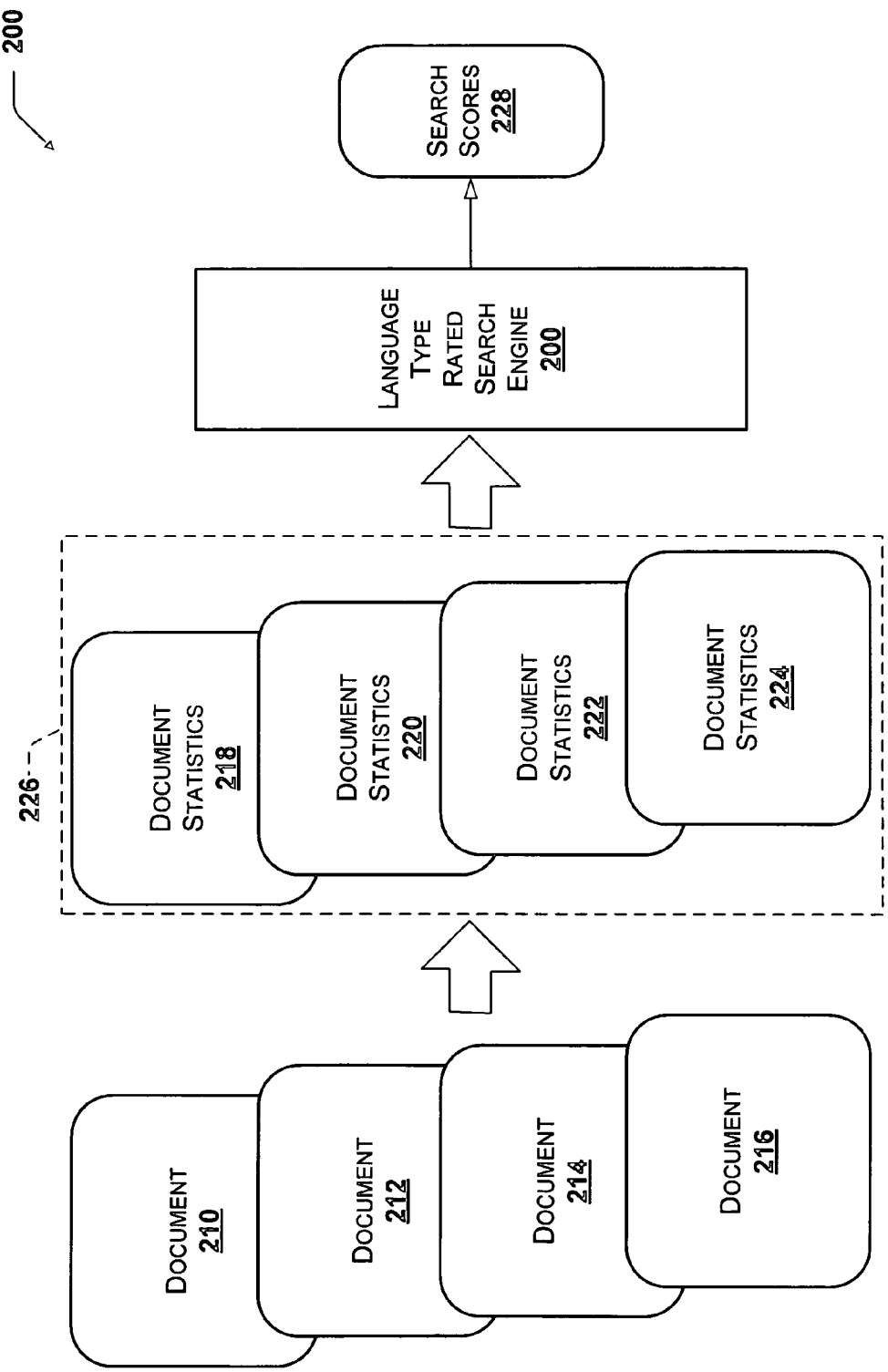
FIG. 2 illustrates a system for ranking search results according to file types in accordance with the present invention.

FIG. 2 illustrates a system for ranking search results according to file types in accordance with the present invention. The search engine 200 receives a query containing multiple query terms. Each query term may include multiple component terms, such as when the query term is a phrase (e.g., the phrase "document management system" may be considered a single query term). In addition, a query may include one or more operators, such as Boolean operators, constraints, etc., which are commonly supported by known search engines.

A plurality of documents on a distributed network, represented by documents 210, 212, 214, and 216, are available for searching. In practice, a search engine may search any number of documents and typically search collections containing large numbers (e.g., millions) of documents. The volume of documents may be reduced from the Internet setting to the intranet setting, but the reduction is usually from billions to millions so that the relative number of documents is still quite large. An indexing module (not shown) generates individual document attributes (e.g., file type) and associated statistics (e.g., term frequencies) (218, 220, 222, and 224) for each document. The document attributes and statistics are stored in an index 226.

Search engine 200 consults index 226 to determine a search score 228 for each document based on the query and the corresponding document attributes and statistics. One of the document attributes included is the language type of the document. The file type is a query-independent attribute that is combined with other query-independent attributes and statistics and query-dependent attributes and statistics to form a document's final score. Typically, document scores 228 are then ranked in descending order to give the user a list of documents that are considered by the search algorithm to be most relevant to the query.

In the illustrated system, the search engine 200 represents a language type rated search engine, which considers the language type of a document in determining the document's search score. Language type rating of a document leverages the relevance judgments associated with each of the language types and the query language. A language-based prior is a query-dependent relevance measure because it rates the document's importance based on a comparison of the document language with the query language. (Another example of a query-dependent ranking function would be counting the number of times a search term appears in a document.)

Figure 3:
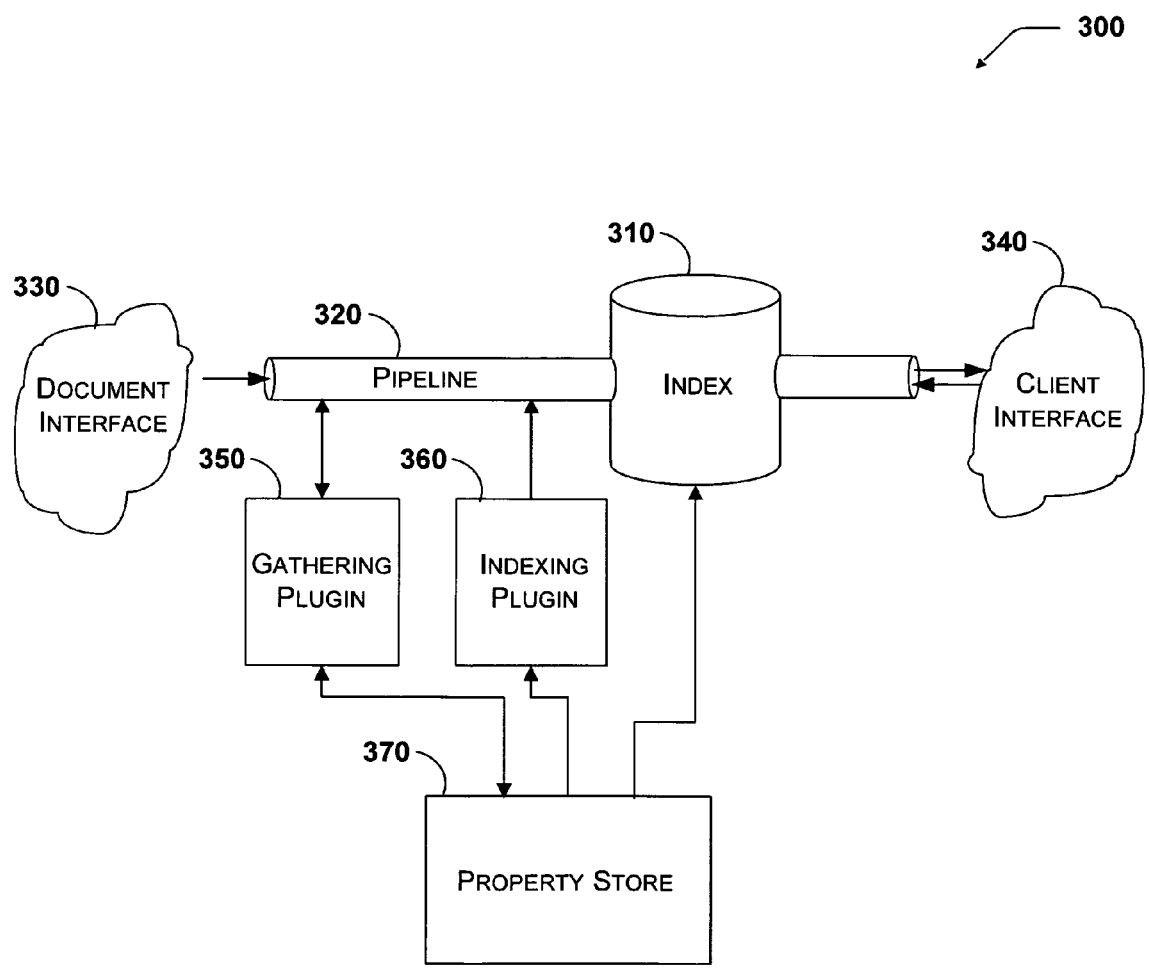
FIG. 3 illustrates a functional block diagram of an exemplary system for gathering properties of documents during searching in accordance with the present invention.

FIG. 3 illustrates a functional block diagram of an exemplary system for gathering properties of documents during searching in accordance with the present invention. System 300 includes index 310, pipeline 320, document interface 330, client interface 340, gathering plugin 350, indexing plugin 360, and property store 270.

Index 310 includes records that correspond to index keys and other document properties. The records of index 310 are used in providing results to client queries. In one embodiment, index 310 corresponds to multiple databases that collectively provide the storage for the index records.

Pipeline 320 is an illustrative representation of the gathering mechanism for obtaining the documents or records of the documents for indexing. Pipeline 320 allows for filtering of data by various plugins (e.g., gathering plugin 350) before the records corresponding to the data are entered into index 310.

Document interface 330 provides the protocols, network access points, and database access points for retrieving documents across multiple databases and network locations. For example, document interface 330 may provide access to the Internet while also providing access to a database of a local server and access to a database on the current computing device. Other embodiments may access other document locations using a variety of protocols without departing from the spirit or scope of the invention.

Client Interface 340 provides access by a client to define and initiate a search. The search may be defined according to keywords and/or other keys.

Gathering plugin 350 is one of several gatherer pipeline plugins. Gathering plugin 350 identifies properties that are included in a document, such as the text from the title or body, and the file type associated with the document. The properties are gathered by gathering plugin 350 as the documents provided through document interface 330 are crawled. In one embodiment, the functionality of gathering plugin 350 identifies all the fields of a document and their associated properties including the language type of the document.

Indexing plugin 360 is another plugin connected to pipeline 320. Indexing plugin 360 provides the mechanism for generating, partitioning, and updating index 310. In one embodiment, indexing plugin 360 provides the word lists that temporarily cache the keywords and other keys generated from crawled documents before flushing these results to index 310. The records of index 310 are populated from the crawl results included in these word lists.

Property store 370 includes the anchor properties that have been gathered by gathering plugin 350. For a particular document, property store 370 includes a record of the file type that is associated with the document. For example, a record in property store 370 may include a document ID that identifies the document and the file type in separate fields. In other embodiments, other fields may be included in property store 370 that are related to a particular document.

Despite the illustration in system 300 of one-way and two-way communications between functional blocks, any of these communication types may be changed to another type without departing from the spirit or scope of the invention (e.g., all communications may have an acknowledgment message requiring two-way rather than one-way communication).

Figure 4:
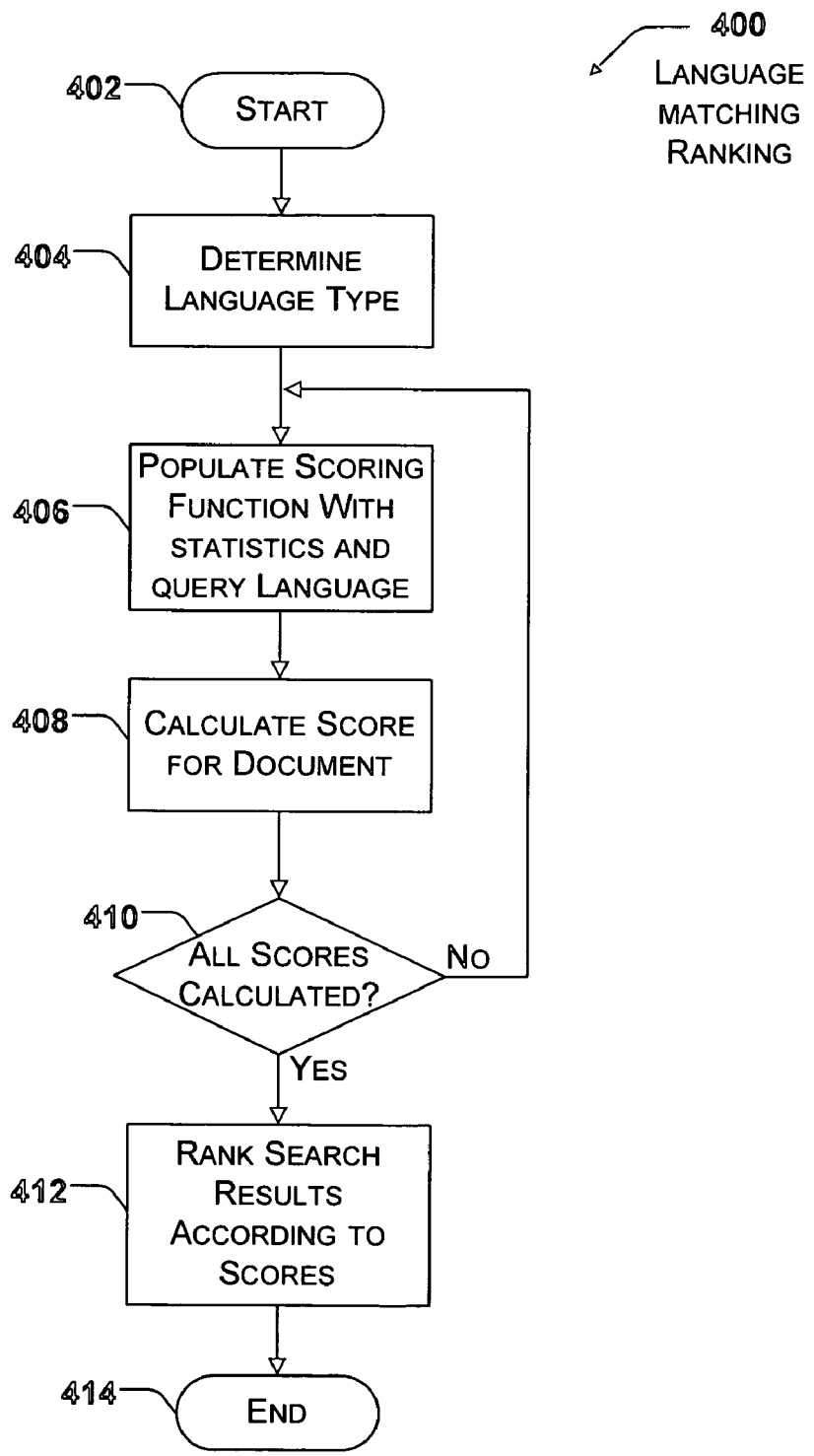
FIG. 4 illustrates a logical flow diagram of an exemplary process for using the file type in ranking search results in accordance with the present invention.

FIG. 4 illustrates a logical flow diagram of an exemplary process for using language type comparison in ranking search results in accordance with the present invention. Process 400 starts at block 402 where a query has been requested and the query-independent values corresponding to the file types have been calculated. In one embodiment, the language type for each document is recorded within a pseudo-key and stored within an index.

The language information about each document is typically stored as an inverted index called query independent rank storage ("QIR"). QIR storage is used for storing associated values that can be used at query time for searching each document. A value is normally stored only once. The QIR storage can be logically viewed as an array of values indexed by document identifiers. In some embodiments, the QIR storage can be a compressed array, because many documents can have the same values stored in the QIR storage, and the default values need not be stored.

For example, the entire score for the values for Click Distance, URL depth, File Types, static features, and the like, can be pre-computed at index time and a single value is stored in the QIR storage associated with each document. Language priors need not stored in this way, because language matching is not strictly query independent. Instead, the original detected language of the document can be stored in a separate QIR storage. In addition, a default language (such as English, or unknown) is not normally stored, so a majority of the documents need not be represented in the language storage. In another embodiment, a value can be repeated in the index for every occurrence of a document (which can create redundancy in storage).

At the end of a crawl, the static ranking features are typically computed and stored in the QIR storage. The detected language is also retrieved from the pseudo keys and stored in its own storage (language storage) to allow quick access to the detected language of the document by document ID at query time.

For example, when the language on an HTML page is determined to be Dutch, the language of the HTML page that is stored in the index can be Dutch or, for example, German, because it can be assumed that German readers can read Dutch. Thus, in an embodiment, classes of languages can be utilized such that a document is not penalized when the document has a language that is in the class as the query language. The query language can be determined via character integration that the query sends such as which languages the browser has been configured to use. With the query received and the language type values calculated, processing continues at block 404.

At block 404, the language type value for each of the documents is merged with the other document statistics (see FIG. 2) in the index. Merging the file type values with the other document statistics computes the correct scores for each of the documents. Once the merge is complete, processing moves to block 406.

At block 406, a scoring function is populated with the set of document statistics, including the component corresponding to the prior probability of relevance based on the file type. The scoring function calculates a score for a particular document. The language type component provides a query-independent factor to the scoring function. The other portion of the scoring function corresponds to other query-independent factors and the query-dependent or content-related portion of the scoring function. In one embodiment, the scoring function is a sum of query-dependent (QD) and query-independent (QID) scoring functions:

$$\text{Score} = QD(doc, query) + QID(doc) \tag{1}$$

The QD function can be any document scoring function. In one embodiment, the QD scoring function corresponds to the field weighted scoring function described in patent application Ser. No. 10/804,326, entitled "Field Weighting in Text Document Searching", filed on Mar. 18, 2004 and hereby incorporated by reference. As provided by the Ser. No. 10/804,326 patent application, the following is a representation of the field weighted scoring function:

$$QD(doc, query) = \sum \frac{wtf(k_1 + 1)}{k_1\left((1-b) + b\frac{wdl}{avwdl}\right) + wtf} \times \log\left(\frac{N}{n}\right) \tag{2}$$

Wherein the terms are defined as follows: wtf is the weighted term frequency or sum of term frequencies of a given term multiplied by weights across all properties; wdl is the weighted document length; avwdl is the average weighted document length; N is the number of documents on the network (i.e., the number of documents crawled); n is the number of documents containing the given query term; and $k_1$ and b are constants. These terms and the equation above are described in detail in the Ser. No. 10/804,326 patent application.

The QID function can be any transformation of document properties or statistics such as the file type component, click-distance, and other document statistics (such as URL depth). In one embodiment this function for click distance and URL depth is as follows:

$$QID(doc) = \sum w_{cd} \frac{1}{k_{cd} + \frac{b_{cd}CD + b_{ud}UD}{b_{cd} + b_{ud}}} \tag{3}$$

Wherein the terms for the function are defined as follows: $W_{cd}$ is the weight of the query-independent component; $b_{cd}$ is the weight of the click distance; $b_{ud}$ is the weight of the URL depth; CD is the Click Distance; UD is the URL Depth; and $k_{cd}$ is the click distance saturation constant. The weighted terms ($w_{cd}$, $b_{cd}$, and $b_{ud}$) assist in defining the importance of each of their related terms and ultimately the shape of the scoring functions. The URL depth (UD) is an addition to the query-independent component to smooth the effect of the click distance on the scoring function. In some cases, a document that is not very important (i.e., has a large URL depth) may have a short click distance. The two functions of (2) and (3) and the file type component (W(t)) can be added together to yield a scoring function (Score), such that the new scoring function becomes:

$$\text{Score} = \sum \frac{wtf(k_1 + 1)}{k_1\left((1-b) + b\frac{wdl}{avwdl}\right) + wtf} \times \log\left(\frac{N}{n}\right) + \tag{4}$$

$$w_{cd} \frac{1}{k_{cd} + \frac{b_{cd}CD + b_{ud}UD}{b_{cd} + b_{ud}}} + W(t)$$

The score can be adjusted (i.e., documents can be penalized) for having a language that is different than the query language. The language prior weight provides an estimate of the log-odds ratio of probability of relevance given language match over probability of non-relevance given language match:

$$W(l_d, l_q) = \log \frac{P(r|l_d, l_q)}{P(\bar{r}|l_d, l_q)}$$

where r is relevance of the document to any query, $l_d$ is the document language, and $l_q$ is the query language and $W(l_d, l_q)$ is the weight of the prior probability of relevance based on a language match. In an embodiment, a language can be determined as a Boolean language match (where "1" indicates a match, and "0" indicates no match). The weight can be then be multiplied by the determined Boolean value. The weight itself can be a single global weight, or it can be a matrix for all possible pairs of languages.

The language prior weight can be added to (4) to provide:

$$\sum \frac{wtf(k_1 + 1)}{k_1\left((1-b) + b\frac{wdl}{avwdl}\right) + wtf} \times \log\left(\frac{N}{n}\right) + \tag{5}$$

$$w_{cd} \frac{1}{k_{cd} + \frac{b_{cd}CD + b_{ud}UD}{b_{cd} + b_{ud}}} + W(t) + W(l_d, l_q)$$

In an embodiment, the weight of the language prior can be considered as part of the static rank of the document, similar to file type priors, but in fact depends on the query, because the feature itself is a function of both query and document language. This creates an implementation detail, where instead of pre-computing the actual static score and storing it in the index as a value for each document, the original detected language of the document is stored, and the feature determined at query time in response to a comparison of the query language and the document language match. Once scoring function (5) is populated with the document statistics for a particular document, processing proceeds to block 408.

At block 408, the scoring function is executed and the relevance score for the document is calculated. Once the relevance score is calculated, it is stored in memory and associated with that particular document. Processing then moves to decision block 410.

At decision block 410, a determination is made whether relevance scores for all the documents corresponding to the search query have been calculated according to scoring function (5). The scores may be calculated serially as shown or in parallel. If all the scores have not been calculated, processing returns to block 406 where the scoring function is populated with the next set of document statistics. However, if all the scores have been calculated, processing continues to block 412.

At block 412, the search results of the query are ranked according to their associated scores. The scores now take into account the language type of each of the documents. Accordingly, the ranking of the documents has been refined so that documents of a particular language type that is in the same language class as the query language (for example) are ranked higher than other documents having language types that are different from the query language. Once the search results are ranked, processing proceeds to block 414, where process 400 ends.

After process 400 is complete, the ranked documents may be returned to the user by the various operations associated with the transmission and display of results by a search engine. The documents corresponding to the higher precision results may then be selected and viewed at the user's discretion.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for ranking search results, comprising:
   determining a first property associated with each document in a collection of documents; wherein the first property is a language type associated with the document that identifies a language of the document; wherein the language of the document is determined by performing a statistical analysis of a character distribution in the document and comparing it to a trained language character distribution; storing an identified language for each of the documents when it is determined that the identified language is not a default language in a language storage that is a query independent rank (QIR) storage that is separate from a QIR storage that stores other values used at query time;
   determining a query language of a search query;
   estimating a ranking value corresponding to properties for each document, wherein the ranking value corresponds to a measure of the relevance of each document based on the search query;
   ranking each document that is responsive to the search query to obtain the search results, wherein each document is ranked based on the estimated ranking value and a comparison of the query language with the first property value;
   ranking the documents according to a scoring function (score) that is determined according to at least: a computed click distance (CD), a weight of a query-independent component ($w_{cd}$), a weight of the click distance ($b_{cd}$), a weight of a URL depth ($b_{ud}$), the URL depth (UD) and a click distance saturation constant ($K_{cd}$); and
   using the ranking of the documents to display the search results.

2. The computer-implemented method of claim 1, wherein the comparison lowers the ranking of the document when the query language is different from the document language.

3. The computer-implemented method of claim 1, wherein the comparison lowers the ranking of the document when the query language class is different from the document language class.

4. The computer-implemented method of claim 1, wherein the comparison lowers the ranking of the document when the query language is different from the document language except when the document language is English.

5. The computer-implemented method of claim 1, wherein the comparison lowers the ranking of the document when the query language is different from the document language except, when the document language is English, the comparison lowers the ranking of the document to a lesser extent than if the document language is a different language other than English.

6. The computer-implemented method of claim 1, wherein determining the language of the document is performed during an indexing process of the documents for searching.

7. The computer-implemented method of claim 1, wherein the query language is determined from a language setting that is derived from a browser used to initiate the search query.

8. The computer-implemented method of claim 1, wherein ranking each document further comprises using a component corresponding to the first property in a scoring function for determining a relevance score for each of the documents.

9. The computer-implemented method of claim 1, wherein the first property for a document is stored within a pseudo-key that associates the first property with the document in the index.

10. The computer-implemented method of claim 1, wherein the scoring function (score) is further determined according to the weight of the prior probability of relevance based on a language match ($W(l_d, l_q)$).

11. The computer-implemented method of claim 10, wherein the scoring function (score) is further determined according to file type priors.

12. The computer-implemented method of claim 11, wherein the scoring function (score) is further determined according to: a weighted term frequency (wtf), a weighted document length (wdl), an average weighted document length (avwdl), a number of documents on the network (N); a number of documents containing a query term (n), and other constants ($k_1$, b).

13. The computer-implemented method of claim 12, wherein the scoring function (score) is given by the following formula; wherein each value within the scoring function is a definite value, wherein W(t) is a file type component; and wherein the weight of the prior probability of relevance based on a language match ($W(l_d, l_q)$):

$$\sum \frac{wtf(k_1+1)}{k_1\left((1-b)+b\frac{wdl}{avwdl}\right)+wtf} \times \log\left(\frac{N}{n}\right) + w_{cd}\frac{1}{k_{cd}+\frac{b_{cd}CD+b_{ud}UD}{b_{cd}+b_{ud}}} + W(t) + W(l_d, l_q)$$

14. A system for ranking search results, comprising:
   a processor;
   a search engine included on a computing device, the search engine configured to execute computer-executable instructions, the computer-executable instructions comprising:
   determining a first property associated with each document in a collection of documents; wherein the first property is a language type that identifies a language of the document, wherein the language type for each of the documents is only stored in a separate QIR (Query Independent Rank) storage when the language type is not a default language from another QIR storage used for storing values that can be used at query time for searching each document;

determining a query language of a search query;

estimating a ranking value corresponding to properties for each document, wherein the ranking value corresponds to a measure of the relevance of each document based on the search query; and ranking each document that is responsive to the search query to obtain the search results, wherein each document is ranked based on the estimated ranking value and a comparison of the query language with the first property value;

ranking the documents according to a scoring function (score) that is determined according to at least: a computed click distance (CD), a weight of a query-independent component ($w_{cd}$), a weight of the click distance ($b_{cd}$), a weight of a URL depth ($b_{ud}$), the URL depth (UD), a click distance saturation constant ($K_{cd}$), a weighted term frequency (wtf), a weighted document length (wdl), an average weighted document length (avwdl), a number of documents on the network (N); a number of documents containing a query term (n); and using the ranking of the documents to display the search results.

15. The system of claim 14, wherein the scoring function (score) is further determined according to at least: the first property for a language match ($W(l_d, l_q)$).

16. The system of claim 15, wherein the scoring function (score) is further determined according to: other constants ($k_1$, b), a file type component W(t), the weight of the prior probability of relevance based on a language match ($W(l_d, l_q)$), and the scoring function (score) is given by:

$$\sum \frac{wtf(k_1 + 1)}{k_1\left((1-b) + b\frac{wdl}{avwdl}\right) + wtf} \times \log\left(\frac{N}{n}\right) + w_{cd}\frac{1}{k_{cd} + \frac{b_{cd}CD + b_{ud}UD}{b_{cd} + b_{ud}}} + W(t) + W(l_d, l_q)$$

17. A computer-readable storage medium that includes computer-executable instructions for ranking search results, the computer-executable instructions comprising:

determining a first property associated with each document in a collection of documents; wherein the first property is a language type associated with the document; wherein the collection of documents comprises documents of a default language and documents not of a default language; wherein the language type identifies a language of the document and is only stored in a language QIR (Query Independent Rank) storage when the language type is not the default language; wherein a separate QIR storage from the language QIR storage is used for storing values that can be used at query time for searching each document;

determining a query language of a search query;

estimating a ranking value corresponding to properties for each document, wherein the ranking value corresponds to a measure of the relevance of each document based on the search query;

ranking each document that is responsive to the search query to obtain the search results, wherein each document is ranked based on the estimated ranking value and a comparison of the query language with the first property value; and using the ranking of the documents to display the search results.

18. The computer-readable medium of claim 17, wherein the comparison lowers the ranking of the document when the query language is different from the document language.

19. The computer-readable medium of claim 17, wherein the comparison lowers the ranking of the document when the query language class is different from the document language class when the document language is English.

20. The computer-readable medium of claim 17, further comprising adjusting a query-independent value for each document, as additional search queries are performed and a relevance measure of the search results based on the file types is made.

\* \* \* \* \*